United States Patent
Parsels et al.

(10) Patent No.: US 12,301,151 B2
(45) Date of Patent: May 13, 2025

(54) BOOSTED ROTOR SUPPLY CIRCUIT AND METHOD FOR IMPROVING PULSED ELECTRIC MACHINE EFFICIENCY

(71) Applicant: Tula eTechnology, Inc., San Jose, CA (US)

(72) Inventors: John W. Parsels, San Jose, CA (US); Babak Mazda, Los Altos, CA (US)

(73) Assignee: Tula eTechnology, Inc., San Jose, CA (US)

( * ) Notice: Subject to any disclaimer, the term of this patent is extended or adjusted under 35 U.S.C. 154(b) by 73 days.

(21) Appl. No.: 18/452,363

(22) Filed: Aug. 18, 2023

(65) Prior Publication Data
US 2024/0063745 A1 Feb. 22, 2024

Related U.S. Application Data

(60) Provisional application No. 63/399,983, filed on Aug. 22, 2022.

(51) Int. Cl.
*H02P 27/08* (2006.01)

(52) U.S. Cl.
CPC ........ *H02P 27/085* (2013.01); *H02P 2201/09* (2013.01)

(58) Field of Classification Search
CPC ...... H02P 27/085; H02P 2201/09; H02P 6/20; H02P 2207/05; H02P 6/32
USPC ................................ 318/503, 494
See application file for complete search history.

(56) References Cited

U.S. PATENT DOCUMENTS

| | | | |
|---|---|---|---|
| 4,441,043 | A | 4/1984 | Decesare |
| 4,989,146 | A | 1/1991 | Imajo |
| 5,099,410 | A | 3/1992 | Divan |
| 5,151,637 | A | 9/1992 | Takada et al. |
| 5,325,028 | A | 6/1994 | Davis |
| 5,483,141 | A | 1/1996 | Uesugi |
| 5,640,073 | A | 6/1997 | Ikeda et al. |
| 5,731,669 | A | 3/1998 | Shimizu et al. |
| 6,291,960 | B1 | 9/2001 | Crombez |
| 6,308,123 | B1 | 10/2001 | Ikegaya et al. |

(Continued)

FOREIGN PATENT DOCUMENTS

| | | |
|---|---|---|
| CN | 1829070 A | 9/2006 |
| CN | 102381265 A | 3/2012 |

(Continued)

OTHER PUBLICATIONS

Cai et al., "Torque Ripple Reduction for Switched Reluctance Motor with Optimized PWM Control Strategy", https://www.mdpi.com/1996-1073/11/11/3215, Oct. 15, 2018, 27 pages.
Spong et al., "Feedback Linearizing Control of Switched Reluctance Motors", IEEE Transactions on Automatic Control, vol. AC-32, No. 5, May 1987, pp. 371-379.

(Continued)

*Primary Examiner* — David Luo
(74) *Attorney, Agent, or Firm* — Beyer Law Group LLP

(57) ABSTRACT

A boost circuit and method is described for supplying a boost voltage to a rotor of the electric machine, just as the electric machine is pulsed on, the boost voltage aids the rotor in quickly overcoming its start-up inductance, rapidly turn on the rotor. As a result, much faster transition times are realized each time the electric machine transitions from the off state to the on state at the start of a pulse. By reducing the transition time, the overall efficiency of the electric machine is significantly improved.

25 Claims, 7 Drawing Sheets

(56) References Cited

U.S. PATENT DOCUMENTS

| | | |
|---|---|---|
| 6,370,049 B1 | 4/2002 | Heikkila |
| 6,424,799 B1 | 7/2002 | Gilmore |
| 6,493,204 B1 | 12/2002 | Glidden et al. |
| 6,605,912 B1 | 8/2003 | Bharadwaj et al. |
| 6,829,515 B2 | 12/2004 | Grimm |
| 6,829,556 B2 | 12/2004 | Kumar |
| 6,906,485 B2 | 6/2005 | Hussein |
| 6,940,239 B2 | 9/2005 | Iwanaga et al. |
| 7,190,143 B2 | 3/2007 | Wei et al. |
| 7,259,664 B1 | 8/2007 | Cho et al. |
| 7,327,545 B2 | 2/2008 | Konishi |
| 7,411,801 B2 | 8/2008 | Welchko et al. |
| 7,453,174 B1 | 11/2008 | Kalsi |
| 7,558,655 B2 | 7/2009 | Garg et al. |
| 7,577,511 B1 | 8/2009 | Tripathi et al. |
| 7,616,466 B2 | 11/2009 | Chakrabarti et al. |
| 7,768,170 B2 | 8/2010 | Tatematsu et al. |
| 7,852,029 B2 * | 12/2010 | Kato ................. H02P 6/182 |
| | | 318/434 |
| 7,960,888 B2 | 6/2011 | Ai et al. |
| 7,969,341 B2 | 6/2011 | Robbe et al. |
| 8,004,220 B2 * | 8/2011 | Sparey ................. H02P 6/16 |
| | | 318/400.14 |
| 8,020,651 B2 | 9/2011 | Zillmer et al. |
| 8,099,224 B2 | 1/2012 | Tripathi et al. |
| 8,768,563 B2 | 7/2014 | Nitzberg et al. |
| 8,773,063 B2 | 7/2014 | Nakata |
| 9,046,559 B2 | 6/2015 | Lindsay et al. |
| 9,050,894 B2 | 6/2015 | Banerjee et al. |
| 9,308,822 B2 | 4/2016 | Matsuda |
| 9,495,814 B2 | 11/2016 | Ramesh |
| 9,512,794 B2 | 12/2016 | Serrano et al. |
| 9,630,614 B1 | 4/2017 | Hill et al. |
| 9,702,420 B2 | 7/2017 | Yoon |
| 9,758,044 B2 | 9/2017 | Gale et al. |
| 9,948,173 B1 | 4/2018 | Abu Qahouq |
| 10,060,368 B2 | 8/2018 | Pirjaberi et al. |
| 10,081,255 B2 | 9/2018 | Yamada et al. |
| 10,256,680 B2 | 4/2019 | Hunstable |
| 10,273,894 B2 | 4/2019 | Tripathi |
| 10,291,168 B2 | 5/2019 | Fukuta |
| 10,291,174 B2 | 5/2019 | Irie et al. |
| 10,320,249 B2 | 6/2019 | Okamoto et al. |
| 10,340,821 B2 | 7/2019 | Magee et al. |
| 10,344,692 B2 | 7/2019 | Nagashima et al. |
| 10,381,968 B2 | 8/2019 | Agirman |
| 10,476,421 B1 | 11/2019 | Khalil et al. |
| 10,550,776 B1 | 2/2020 | Leone et al. |
| 10,742,155 B2 | 8/2020 | Tripathi |
| 10,763,772 B1 | 9/2020 | Fatemi et al. |
| 10,944,352 B2 * | 3/2021 | Mazda ................. H02P 21/02 |
| 11,077,759 B1 | 8/2021 | Srinivasan |
| 11,088,644 B1 | 8/2021 | Carvell |
| 11,133,763 B1 | 9/2021 | Islam |
| 11,133,767 B2 | 9/2021 | Serrano et al. |
| 11,167,648 B1 | 11/2021 | Carvell et al. |
| 11,228,272 B2 | 1/2022 | Tripathi |
| 11,427,177 B2 | 8/2022 | Serrano et al. |
| 11,623,529 B2 | 4/2023 | Carvell et al. |
| 11,626,827 B2 | 4/2023 | Tripathi |
| 11,628,730 B2 | 4/2023 | Srinivasan |
| 11,695,361 B2 | 7/2023 | Carvell et al. |
| 2001/0039926 A1 | 11/2001 | Kobayashi et al. |
| 2002/0043954 A1 | 4/2002 | Hallidy et al. |
| 2004/0263109 A1 | 12/2004 | Schwarz |
| 2005/0127861 A1 | 6/2005 | McMillan et al. |
| 2005/0151437 A1 | 7/2005 | Ramu |
| 2005/0160771 A1 | 7/2005 | Hosoito et al. |
| 2007/0216345 A1 | 9/2007 | Kanamori |
| 2007/0287594 A1 | 12/2007 | DeGeorge et al. |
| 2008/0129243 A1 | 6/2008 | Nashiki |
| 2008/0179980 A1 | 7/2008 | Dawsey et al. |
| 2009/0045691 A1 | 2/2009 | Ichiyama |
| 2009/0121669 A1 | 5/2009 | Hanada |
| 2009/0128072 A1 | 5/2009 | Strong et al. |
| 2009/0146615 A1 | 6/2009 | Zillmer et al. |
| 2009/0179608 A1 | 7/2009 | Welchko et al. |
| 2009/0306841 A1 | 12/2009 | Miwa et al. |
| 2010/0010724 A1 | 1/2010 | Tripathi et al. |
| 2010/0201294 A1 | 8/2010 | Yuuki et al. |
| 2010/0296671 A1 | 11/2010 | Khoury et al. |
| 2011/0029179 A1 | 2/2011 | Miyazaki et al. |
| 2011/0089774 A1 | 4/2011 | Kramer |
| 2011/0101812 A1 | 5/2011 | Finkle et al. |
| 2011/0130916 A1 | 6/2011 | Mayer |
| 2011/0208405 A1 | 8/2011 | Tripathi et al. |
| 2012/0056569 A1 | 3/2012 | Takamatsu et al. |
| 2012/0112674 A1 | 5/2012 | Schulz et al. |
| 2012/0169263 A1 | 7/2012 | Gallegos-Lopez et al. |
| 2012/0217916 A1 | 8/2012 | Wu et al. |
| 2012/0217921 A1 | 8/2012 | Wu et al. |
| 2013/0134912 A1 | 5/2013 | Khalil et al. |
| 2013/0141027 A1 | 6/2013 | Nakata |
| 2013/0226420 A1 | 8/2013 | Pedlar et al. |
| 2013/0241445 A1 | 9/2013 | Tang |
| 2013/0258734 A1 | 10/2013 | Nakano et al. |
| 2014/0018988 A1 | 1/2014 | Kitano et al. |
| 2014/0028225 A1 | 1/2014 | Takamatsu et al. |
| 2014/0130506 A1 | 5/2014 | Gale et al. |
| 2014/0176034 A1 | 6/2014 | Matsumura et al. |
| 2014/0217940 A1 | 8/2014 | Kawamura |
| 2014/0265957 A1 | 9/2014 | Hu et al. |
| 2014/0292382 A1 | 10/2014 | Ogawa et al. |
| 2014/0354199 A1 | 12/2014 | Zeng et al. |
| 2015/0025725 A1 | 1/2015 | Uchida |
| 2015/0240404 A1 | 8/2015 | Kim et al. |
| 2015/0246685 A1 | 9/2015 | Dixon et al. |
| 2015/0261422 A1 | 9/2015 | Den et al. |
| 2015/0297824 A1 | 10/2015 | Cabiri et al. |
| 2015/0318803 A1 | 11/2015 | Wu et al. |
| 2016/0114830 A1 | 4/2016 | Dixon et al. |
| 2016/0226409 A1 | 8/2016 | Ogawa |
| 2016/0233812 A1 | 8/2016 | Lee et al. |
| 2016/0269225 A1 | 9/2016 | Kirchmeier et al. |
| 2016/0373047 A1 | 12/2016 | Loken et al. |
| 2017/0087990 A1 | 3/2017 | Neti et al. |
| 2017/0163108 A1 | 6/2017 | Schencke et al. |
| 2017/0331402 A1 | 11/2017 | Smith et al. |
| 2018/0032047 A1 | 2/2018 | Nishizono et al. |
| 2018/0045771 A1 | 2/2018 | Kim et al. |
| 2018/0154786 A1 | 6/2018 | Wang et al. |
| 2018/0276913 A1 | 9/2018 | Garcia et al. |
| 2018/0323665 A1 | 11/2018 | Chen et al. |
| 2018/0334038 A1 | 11/2018 | Zhao et al. |
| 2019/0058374 A1 | 2/2019 | Enomoto et al. |
| 2019/0288629 A1 | 9/2019 | Tripathi |
| 2019/0288631 A1 | 9/2019 | Tripathi |
| 2019/0319474 A1 | 10/2019 | Tanaka et al. |
| 2019/0341820 A1 | 11/2019 | Krizan et al. |
| 2020/0212834 A1 | 7/2020 | Mazda et al. |
| 2020/0262398 A1 | 8/2020 | Sato et al. |
| 2020/0328714 A1 | 10/2020 | Tripathi |
| 2020/0343849 A1 | 10/2020 | Coroban-Schramel |
| 2020/0366223 A1 | 11/2020 | Coroban-Schramel |
| 2021/0146909 A1 | 5/2021 | Serrano et al. |
| 2021/0159836 A1 | 5/2021 | Mazda et al. |
| 2021/0203263 A1 | 7/2021 | Serrano et al. |
| 2021/0351733 A1 | 11/2021 | Carvell |
| 2022/0234451 A1 | 7/2022 | Srinivasan |
| 2022/0416707 A1 | 12/2022 | Chen |
| 2023/0114289 A1 | 4/2023 | Islam et al. |
| 2023/0219426 A1 | 7/2023 | Carvell et al. |
| 2023/0223885 A1 | 7/2023 | Tripathi |
| 2023/0283211 A1 | 9/2023 | Carvell |

FOREIGN PATENT DOCUMENTS

| | | |
|---|---|---|
| CN | 104716754 A | 6/2015 |
| CN | 204589885 U | 8/2015 |
| CN | 105196877 A | 12/2015 |
| CN | 205229379 U | 5/2016 |
| CN | 106932208 A | 7/2017 |
| CN | 107067780 A | 8/2017 |
| CN | 207129052 U | 3/2018 |

(56) References Cited

FOREIGN PATENT DOCUMENTS

| | | |
|---|---|---|
| CN | 108216026 A | 6/2018 |
| CN | 108445386 A | 8/2018 |
| CN | 110212725 | 9/2019 |
| DE | 102014206342 | 10/2015 |
| EP | 2605398 A1 | 6/2013 |
| FR | 2989479 | 10/2013 |
| GB | 2273212 | 8/1994 |
| JP | 10243680 | 9/1998 |
| JP | 2003-274686 | 9/2003 |
| JP | 2008-079686 A | 4/2008 |
| JP | 2009-065758 A | 3/2009 |
| JP | 2011-67043 | 3/2011 |
| JP | 5165660 B2 | 12/2012 |
| JP | 2014-033449 A | 2/2014 |
| JP | 5857472 B2 | 12/2015 |
| JP | 2017-011970 A | 1/2017 |
| JP | 2017-200382 | 11/2017 |
| JP | 2018-033250 A | 3/2018 |
| JP | 2020048254 A | 3/2020 |
| KR | 10-1475025 | 12/2014 |
| KR | 10-2017-0021146 A | 2/2017 |
| KR | 10-2017-0032976 A | 3/2017 |
| WO | WO03/36787 A1 | 5/2003 |
| WO | WO2012-010993 A2 | 1/2012 |

OTHER PUBLICATIONS

Mirzaeva et al., "The use of Feedback Quantizer PWM for Shaping Inverter Noise Spectrum", Power Electronics and Motion Control Conference (EPE/PEMC), 2012 15$^{th}$ International IEEE, Sep. 4, 2012, pp. DS3c. 10-1, XP032311951, DOI: 10.1109/EPEPEMC. 2012.6397346, ISBN: 978-1-4673-1970.6.

Luckjiff et al., "Hexagonal ΣΔ Modulators in Power Electronics", IEEE Transactions on Power Electronics, Institute of Electrical and Electronics Engineers, USA, vol. 20, No. 5, Sep. 1, 2005, pp. 1075-1083, XP011138680, ISSN: 0885-8993, DOI: 10.1109/TPEL. 2005.854029.

Ramsey, "How This Father and Son's New Electric Turbine Could Revolutionize Electric Cars; Hunstable Electric Turbine can Produce up to Three Times the Torque of Any Other Motor", https://www.parsintl.com/publication/autoblog/, Mar. 8, 2020.

Islam, U.S. Appl. No. 18/165,100, filed Feb. 6, 2023.
Farah et al., U.S. Appl. No. 18/184,569, filed Mar. 15, 2023.
Phillips, U.S. Appl. No. 18/305,776, filed Apr. 24, 2023.
Phillips, U.S. Appl. No. 18/348,255, filed Jul. 6, 2023.
Carvell et al., U.S. Appl. No. 18/362,602, filed Jul. 31, 2023.
International Search Report and Written Opinion dated Dec. 5, 2023 from International Application No. PCT/US2023/030606.
Islam et al., U.S. Appl. No. 18/452,050, filed Aug. 18, 2023.
Islam et al., U.S. Appl. No. 18/452,260, filed Aug. 18, 2023.

\* cited by examiner

BOOSTED ROTOR SUPPLY CIRCUIT AND METHOD FOR IMPROVING PULSED ELECTRIC MACHINE EFFICIENCY

CROSS-REFERENCE TO RELATED APPLICATIONS

This application claims priority of U.S. Provisional Application No. 63/399,983, filed on Aug. 22, 2022, and which is incorporated by reference herein for all purposes.

BACKGROUND

The present application relates generally to pulsed control of an electric machine where the electric machine is selectively controlled to operate between an off state and an on state during pulses, and more particularly, to a boost circuit and method for supplying a boost voltage to a rotor of the electric machine, just as the electric machine is pulsed on, the boost voltage aiding the rotor in quickly overcoming it's start-up inductance to rapidly turn on the rotor, resulting in a much faster transition time as the electric machine transitions from the off state to the on state at the start of a pulse.

Most electric machines, which typically include a stator having a plurality of poles and a rotor, can operate as either a generator or a motor. When operating as motor, electrical energy is converted into mechanical energy. When operating as a generator, mechanical energy is converted into electrical energy. The terms "electrical machine" or "machine" as used herein is therefore intended to be broadly construed to mean both electric motors and generators.

Electric machines have relatively high energy conversion efficiencies, provided they are operating at or near their optimal operational load. When operating below of their optimal operation load, however, the energy conversion efficiency can be considerably lower. Since in many applications electric machines are required to operate below their optimal operational load, overall efficiency of the machine is reduced, wasting the energy required to operate the electric machine.

Pulse control of electric machines is a known approach to improving the efficiency of electric machines. Under selected operating conditions, an electric machine is intermittently transitioned from an off state to an on state during pulses. By operating the electric machine to generate an output only during the on pulses at high efficiency levels, overall efficiency of the machine is improved while generating the needed output, compared to conventional continuous operation below the machine's optimal operational load.

An issue with pulsed controlled is that a relatively large amount of energy and time is required to transition a given electric machine from the off state to the on state with each pulse.

A need therefore exists to transition electric machines quickly and efficiently from the off state to the one state with each pulse, thereby operating such electric machines at even higher levels of efficiency.

SUMMARY

The present application is directed to a boost circuit and method for supplying a boost voltage to a rotor of the electric machine, just as the electric machine is pulsed on, the boost voltage aids the rotor in quickly overcoming its start-up inductance, rapidly turn on the rotor. As a result, much faster transition times are realized each time the electric machine transitions from the off state to the on state at the start of a pulse.

BRIEF DESCRIPTION OF THE DRAWINGS

The invention and the advantages thereof, may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION

Electric motors and generators are used in a very wide variety of applications and under a wide variety of operating conditions. In general, many modern electric machines have relatively high energy conversion efficiencies. However, the energy conversion efficiency of most electric machines can vary considerably based on their operational load. In general, when operating at or near their peak operational loads, electrical machines are highly efficient. However, when operating at lower load, efficiency tends to be much lower.

The present application relates generally to pulsed control of electric machines (e.g., electric motors and generators) to improve their energy conversion efficiency when operating conditions warrant. More specifically, under lower load operating conditions, an electric machine is pulsed controlled and intermittently transitioned between an off state and an on state during pulses. By controlling the magnitude, duty cycle and frequency of the pulses, the electric machine can be controlled to operate only at its higher efficiency levels compared to conventional continuous motor control, thereby delivering a desired average torque output in a more energy efficient manner than previously possible.

The Applicant has filed and received several U.S. Patents covering the pulsed motor control of electric machine, including U.S. Pat. Nos. 10,742,155, 11,228,272, and 10,944,352. Each of the above-listed applications are incorporated by reference herein for all purposes

Pulsed Machine Control

Figure 1:
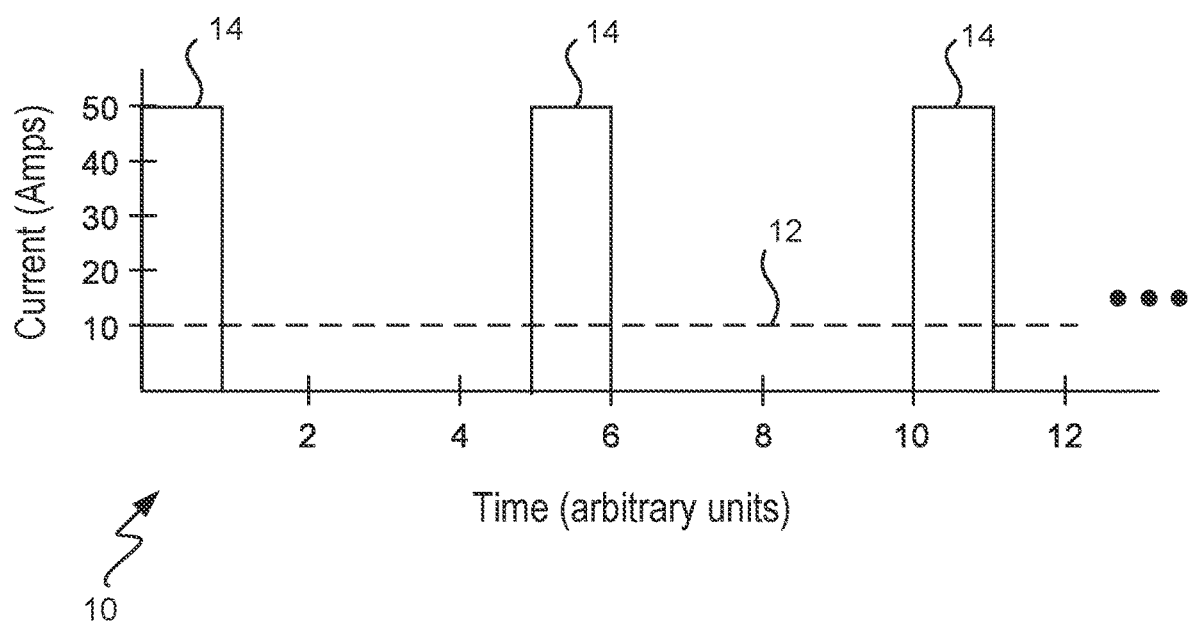
FIG. 1 is graph illustrating pulsed operation of a motor in accordance with a non-exclusive embodiment of the invention.

Referring to FIG. 1, a graph 10 illustrating the basic operation of pulsed machine control is illustrated. In this example, several assumptions are made, including:

The electric machine is operating as an electric motor.

As plotted along the vertical axis, the maximum torque output of the motor is 50 Nm.

The peak efficiency range of the motor is approximately 95% of its peak output, or a torque output of approximately 47.5 Nm.

The motor is requested, in this example, to generate an output toque of 10 Nm, which is well below its peak efficiency range.

With conventional operation, the motor is continuously operated to generate the requested torque output of 10 Nm. This is represented in FIG. 1 by the dashed line 12. The disadvantage of continuously operating with a torque output of 10 is that the motor is operating well below its peak efficiency range (e.g., 47.5 Nm or above in this example).

With pulsed operation on the other hand, the motor is pulsed on and off. Between on pulses, the motor is in the off state and generates little to no torque output. During the on pulses, the motor:

(1) Is in the on state and operates at or near its peak efficiency (i.e., at 50); and (2) The average torque output of the motor over time, during which the motor is intermittent pulsed between the off and on states, is sufficient to meet the ascertained torque request.

In this example, the frequency of the on pulses occur once every five (5) time units as plotted along the horizontal axis. As a result, the motor is pulsed on twenty percent (20%) of the time, as represented by the pulses 14. By operating the motor at its peak output (e.g., 50) every fifth time unit (i.e., twenty percent twenty percent (20%) of the time), the requested 10 Nm of torque is generated over time. However, since the motor is operated only at or near its peak efficiency during the pulses, the overall operating efficiency of the motor is significantly improved over conventional continuous operation.

Three-Phase Wound Field Synchronous Machine

In a three-phase wound field synchronous machine, the stator may include a three-coil winding that is excited by a three-phase AC input and the field windings on the rotor that are powered by a DC input. When the three-phase AC input is passed through the three-phase armature windings, a rotating magnetic field (RMF) is generated. The rotational rate of the RMF is known as the synchronous speed ($N_s$) of the electric machine. The interaction of the field winding fields and armature winding fields generates an electromagnetic force (EMF) causing the rotor rotation.

Power Converter

Figure 2:
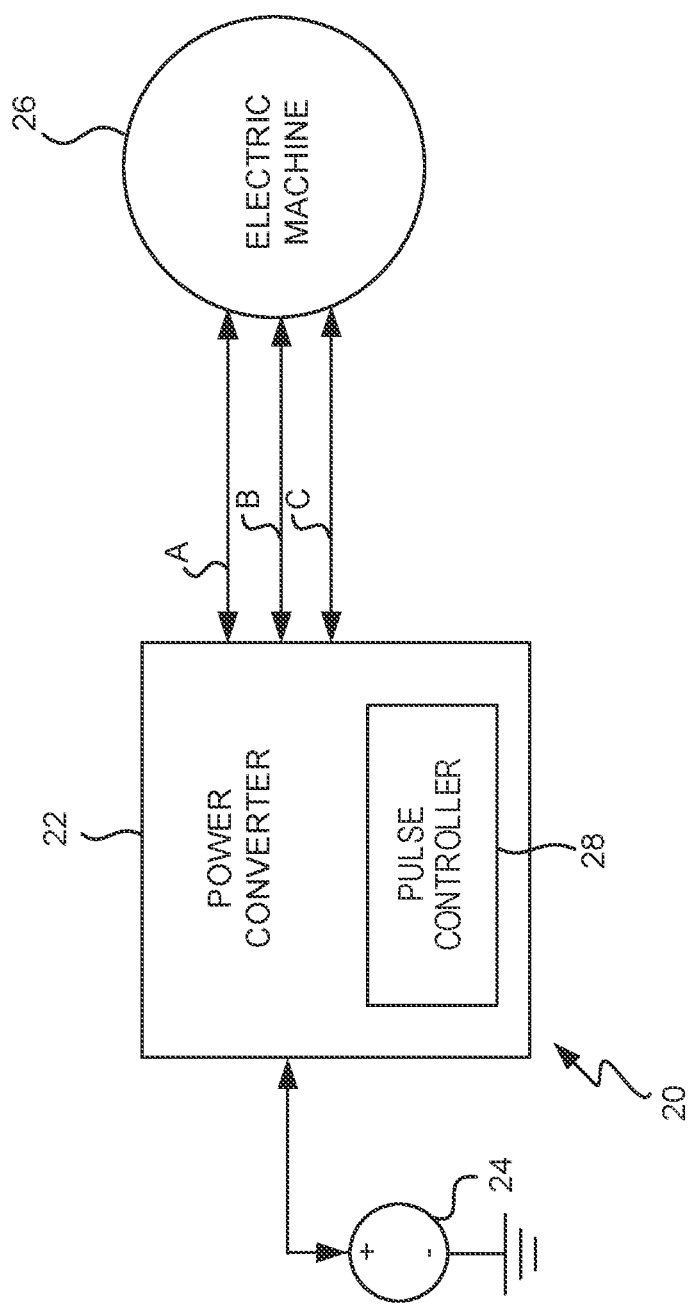
FIG. 2 is a functional block diagram illustrating a motor controller architecture in accordance with a non-exclusive embodiment of the invention.

Referring to FIG. 2, a diagram of a power controller 20 for pulsed operation of an electric machine is illustrated. The power controller 20 includes a power converter 22, a DC power supply 24, and an electric machine 26. In this non-exclusive embodiment, the power converter 22 also includes a pulse controller 28.

The power converter 22 may be operated as a power inverter or power rectifier depending on the direction of energy flow through the system.

When the electric machine 26 is operated as a motor, the power converter 22 is responsible for generating three-phased AC power from the DC power supply 24 to drive the electric machine 26. The three-phased input power, denoted as phase A, phase B, and phase C, is applied to the windings of the stator of the electric machine 26 for generating the RMF as described above.

During motor operation, the pulse controller 28 is responsible for selectively pulsing the three-phased input power provided to the electric machine 26. During conventional (i.e., continuous) operation, the three-phases A, B and C of the input power are continuous (i.e., not pulsed). During pulsed operation, the three-phases A, B and C, are selectively pulsed.

When the electric machine is operating as a generator, the power converter 22 operates as a power rectifier and the AC power coming from the electric machine 26 is converted to DC power and is stored in the DC power supply 24.

The lines depicting the phases, A, B, and C are shown with arrows on both ends indicating that current can flow both from the power converter 22 to the electric machine 26 when the machine is operating as a motor, or that current can flow in the opposite direction when the machine is used as a generator.

Pulsed Motor Control

Figure 3:
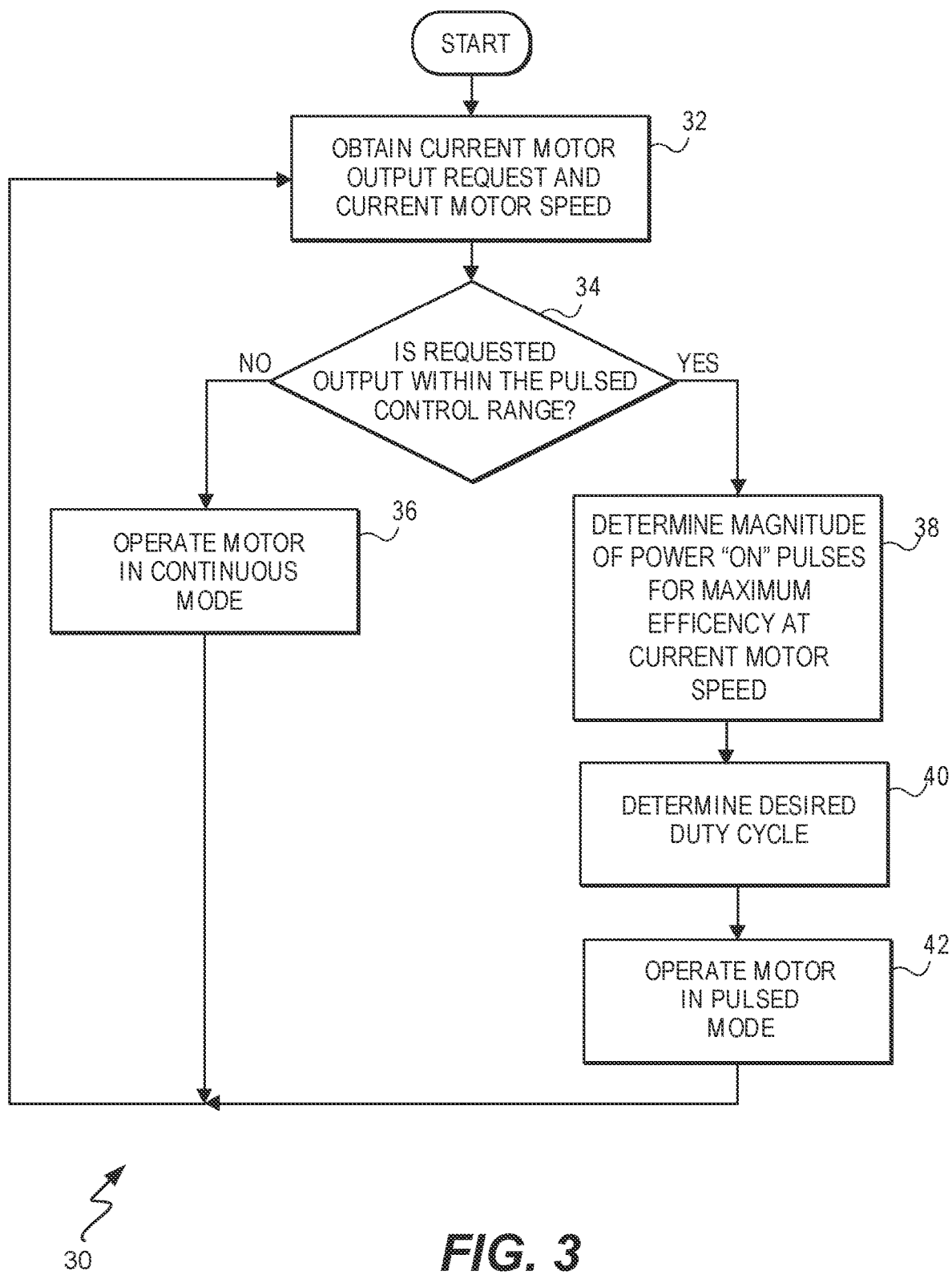
FIG. 3 is an operational flow diagram illustrating steps implemented by the motor controller in accordance with a non-exclusive embodiment of the invention.

Referring to FIG. 3, a flow diagram 30 illustrating steps implemented by the pulse controller 28 for pulsed control operation of the electric machine 26 while operating as an electric motor are shown.

In the initial step 32, the current motor output and current motor speed are ascertained.

In decision step 34, a determination is made based on the current motor output and current motor speed if the motor should be operated in a continuous mode or a pulsed mode. In other words, a determination is made if the desired motor torque is above or below the most efficient output torque range for the current motor speed (e.g., 47.5 Nm in the FIG. 1 example).

In step 36, the motor is operated in the continuous mode if the current motor torque request is above the most efficient output torque for the current motor speed.

In the alternative step 38, the motor is operated in the pulsed mode if the current motor torque request is below the most efficient output torque for the current motor speed.

In step 40, the desired pulse magnitude, duty cycle and frequency for operation in the pulsed mode are determined so that the average output power or torque over time matches the desired torque output.

In step 42, the motor is operated in the pulsed mode using the determined pulse magnitude, duty cycle and frequency of the pulses.

The above steps 32-42 are continuously performed while the motor is in operation. At any given motor speed, there will be a corresponding most efficient output torque at which the motor operates at or near its maximum efficiency. As the instantaneous motor output request and/or current motor speed change, a decision is made to operate the motor in either the continuous or pulsed mode as appropriate.

From a conceptual standpoint, the more often the desired motor torque is below the most efficient output torque for the current motor speed, the more significant the overall efficiency of the motor can be improved by pulsing the motor.

Pulse Rise Times

Current power converters are typically designed for continuous, not pulsed operation. Such power converters are typically required to transition from the unenergized to an energized state relatively infrequently. As a result, little design effort has been made to date in managing the transition time between when a machine is off to when it is pulsed on. To the extent any such efforts have been made, the focus is typically directed to achieving a smooth transition as opposed to a fast transition. The transition from a non-energized (off) to an energized state (pulsed on) for most electric machines, is therefore, relatively not very fast.

The applicants have discovered that for an electric machine system that frequently transitions from a non-energized state to peak efficiency state such as with pulsed operation, further efficiency improvements can be realized when the transitions occur as fast as possible. With fast transitions, for example from zero torque to the peak efficiency torque, the overall average efficiency is improved because the motor spends less time in transition where efficiency is less than the peak. This relationship is depicted in FIG. 4A and FIG. 4B.

Figure 4A:
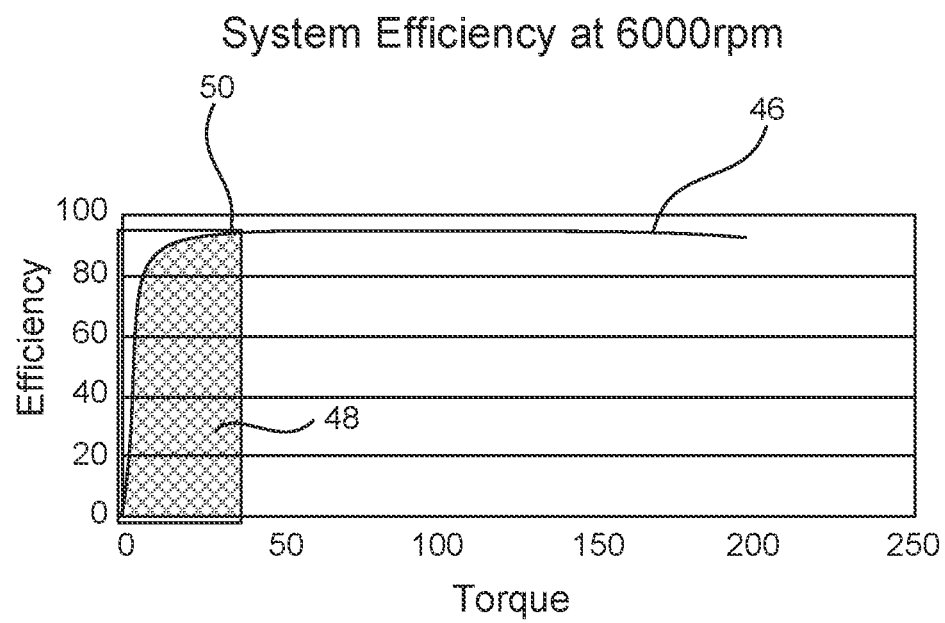
FIG. 4A is a torque versus efficiency map for a motor operating at a fixed speed during a transition from zero to peak efficiency torque.

Referring to FIG. 4A, a torque versus efficiency map for an exemplary electric machine operating as a motor at a fixed speed (e.g., 6000 rpms) is illustrated. In the exemplary map, a range of torque outputs from 0.0 Nm to 250 Nm is plotted along the horizontal axis, while the efficiency of the motor from 0.0 percent to 100 percent is plotted along the vertical axis. The curve 46 depicts the transition of the motor from zero to peak efficiency torque. During this transition, as depicted by the shaded region 48, the motor is operating at a much lower efficiency before reaching at or near the peak efficiency of the motor as depicted by reference number 50.

Figure 4B:
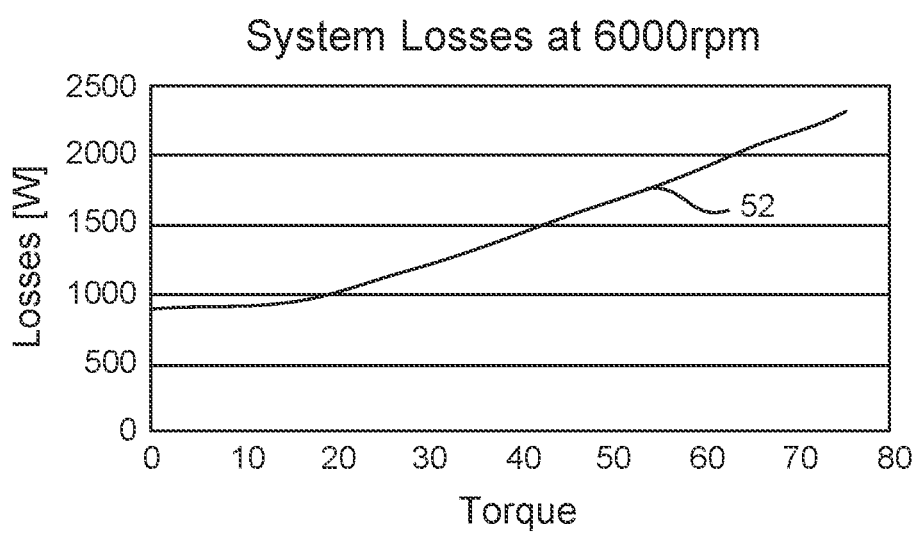
FIG. 4B is a torque versus work lost for an exemplary motor operating at a fixed speed during a transition from zero to peak efficiency torque.

Referring to FIG. 4B, a map is provided illustrating torque versus work lost for an exemplary motor operating at a fixed speed during a transition from zero to peak efficiency torque. In this map, the work losses (W) are plotted along the vertical axis, while the torque output of the motor is plotted along the horizontal axis. As demonstrated by the curve 52, the work losses of the motor increase as the torque output increases during the transition from zero to peak efficiency torque. Therefore, the faster that transition time from zero to peak efficiency torque, the less work is performed, and the less energy is consumed by the electric motor.

By substituting time in place of torque along the horizontal axis and then integrating the area under the curve 52, the energy consumed by the electric motor can be calculated for a given transition time. For instance, with an exemplary motor, 7234.5 Joules of energy was used with a transition time of 0.5 seconds, while only 723.4 Joules of energy were used a transition time of 0.05 second. This comparison demonstrates that the faster the transition time from zero to peak efficiency torque, the lower the energy consumed in losses. It should be noted that with this example, it is assumed that no acceleration of the load has taken place, so no energy has been added to the load inertia. Just as efficiency is increased by reducing rise time, efficiency can also be increased by reducing pulse fall times as well.

For different motors, the transition of the motor from zero to peak efficiency torque, the peak efficiency torque and the work losses will all vary. The maps of FIGS. 4A and 4B should, therefore, be viewed as merely exemplary and should not be construed as limiting in any regard.

Boosting Rotor Supply Voltage

The Applicants have discovered that the transition time for transitioning an electric machine from the off state to the on state when pulsed can be significantly reduced by applying a boost voltage to the rotor at the start of each pulse. By applying the boost voltage, the inherent turn-on time determined by the inductance and resistance of the rotor is reduced, allowing the winding of the rotor to be rapidly energized to the target operating current, developing the desired rotor flux faster than would be the case without boosted rotor voltage. By significantly reducing the transition time from the off state to the on state for each pulse, the overall efficiency for pulsed controlled electric machines can be significantly improved.

As detailed below, the boost voltage applied to the rotor can be generated or otherwise supplied in one of several different ways.

In one embodiment, an external power supply, such as a battery or other power source, can be used to provide the boost voltage. Alternatively, the boost voltage can be generated internal to the electric machine.

Figure 5A:
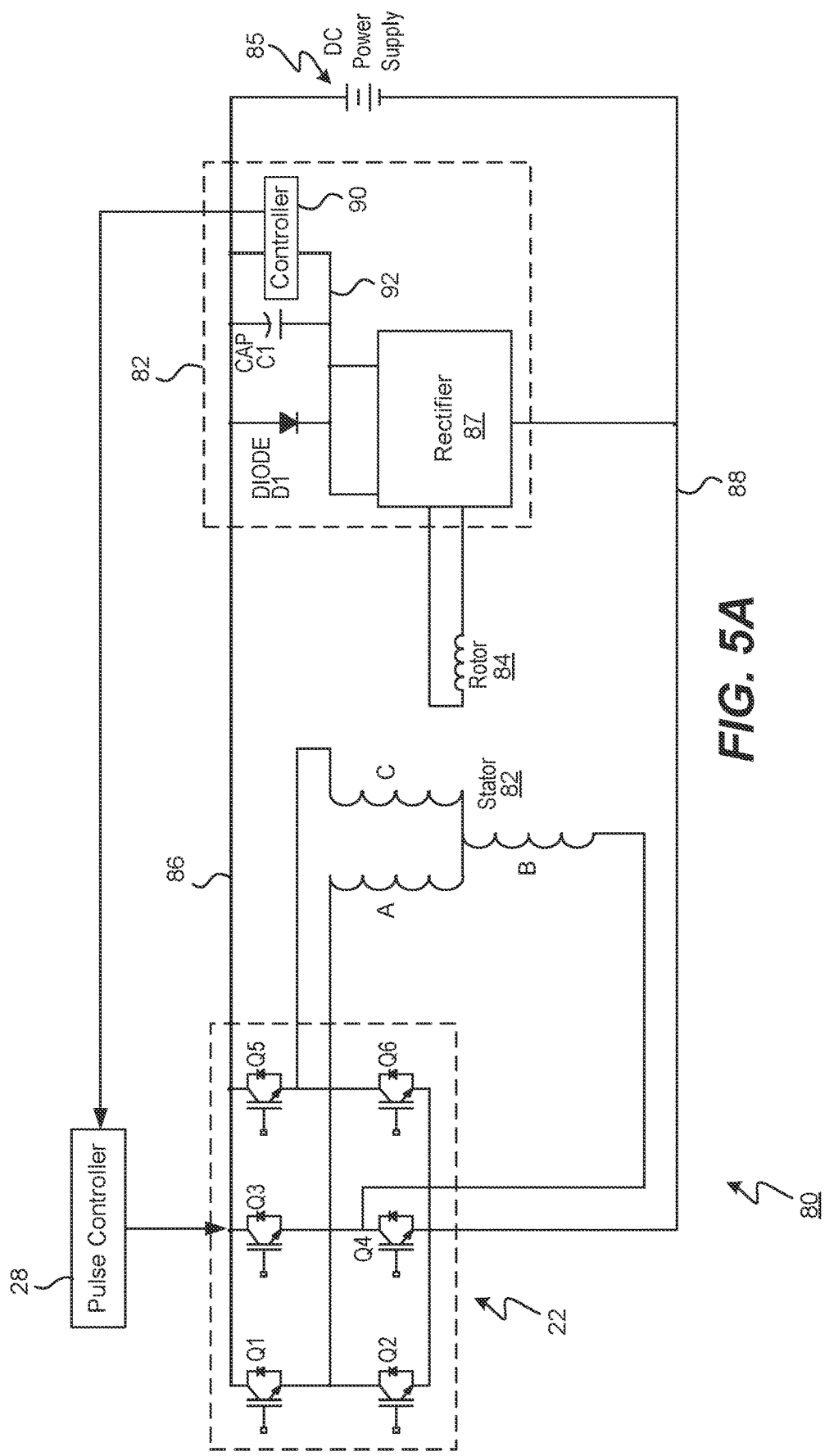
FIG. 5A is an exemplary boost circuit for boosting a supply voltage applied to a rotor of the electric machine in accordance with a non-exclusive embodiment of the invention.

Referring to FIG. 5A, an exemplary electric machine 80 with a boost circuit 82 is illustrated. In the explanation below, the electric machine 80 is operated as a motor. As noted above however, the electric machine 80 can also be operated as a generator as well.

With this embodiment, much of the existing electric components of the electric machine 80, with a few additional components, are used to generate and store a boost voltage. As described in detail below, a storage device such as a capacitor is charged during off states between pulses. Then, just as the electric machine starts its transition into the on state with the next on pulse, the charge on the storage device is used to "boost" the supply voltage otherwise applied to the rotor. As a result, the rotor is turned on faster, significantly reducing the transition time of the electric machine from the off state to the on state compared to if no boost voltage is used. Since mostly existing elements of the electric machine 80 are used to generate the boost voltage with this embodiment, the benefits of faster transition times are realized almost for "free", with little overhead in terms of additional circuitry or components.

The electric machine 80 includes a power converter 22, pulse controller 28, a stator 82 with three winding labelled A, B and C, a rotor 84, and a DC power supply 85 (e.g., a battery) coupled to a first power rail 86 and a second power rail 88.

The power converter 22 includes three sets of transistor-diode pairs labelled Q1-Q2, Q3-Q4, and Q5-Q6 respectively. As is well known in the art, the three sets of transistor-diode pairs generate from the DC power supply 85 three-phase AC power to the three windings A, B and C of the stator 82 respectively.

As previously described, the pulse controller 28 determines if the machine 80 should be operated in the continuous mode or the pulsed modes. If the latter, the pulse controller 28 determines the magnitude, duty cycle and frequency of the pulses, depending such factors as the current speed of the electric machine and/or the instantaneous demand on the electric machine. In response, the pulse controller 28 controls the power converter 22 to selectively energize the windings A, B and C of the stator 82 as needed to realize the desired magnitude, duty cycle and frequency of the pulses. Between the pulses, the windings A, B and C are de-energized and the electric machine 80 is in the off state. In the continuous mode, the pulse controller 28 directs the power converter 22 to continually energize the windings A, B and C of the stator 82.

The boost circuit 82 includes a rectifier 87, a storage device such as a capacitor C1, and a controller 90 coupled between the power rail 86 and another power rail 92. Also, a one-way current flow device such as diode D1 is couple between the rails 86 and 92. With this arrangement, diode D1 allows current flow from the power rail 86 to the rail 92, but not in the opposite direction.

During pulsed-mode operation of the electric machine 80, the pulse controller 28 and the controller 90 cooperate to (1) recharge the capacitor C1 up to a target boost voltage when the electric machine 80 is in the off state between on pulses, and (2) supply the boost voltage from the capacitor C1, in addition to the voltage from the DC power supply 85, to the rotor 84 just at the start of the transition for the next on pulse. With the additional boost voltage at the start of a pulse, the rotor 84 is rapidly energized and turned on faster compared to if no boost voltage is applied as described above.

As the rotor is rapidly energized, the charge on the capacitor C1 is depleted. Once the rotor 84 has been fully energized, it is powered only by the DC power supply 85 for the remainder of the on pulse. With this arrangement, the boost voltage is thus applied only when it is needed the most, meaning at the transition from the off state to the one state at the start of each pulse.

The capacitor C1 is re-charged in the off state between on pulses by the pulse controller 28 directing the power controller 22 to energize at least one of the windings A, B and/C of the stator 82 for short time-period after the electric machine has transitioned from the on state to the off state at the end of each pulse. Typically, the windings are simply de-energized during this transition. However, by energizing at least one of the windings A, B and/or C beyond the transition, and switching any of the inactive phases to the negative bus voltage on power rail 88, it induces an AC voltage in the rotor 84 as the rotor moves through the flux produced by the stator or as a phase is pulsed. In response, the rectifier 87 converts the AC voltage into a DC voltage, which in turn is stored on the storage plate of the capacitor C1. Once the charge on the capacitor C1 reaches a target boost voltage, then the controller 90 directs the power converter 22, via the pulse controller 28, to stop the energization of the one or more windings A, B and/or C of the stator. The controller 90 thus acts as a voltage clamp for limiting the voltage stored on the capacitor C1 once the storage of the target boost voltage is achieved. As a result, the desired boost voltage is (1) harvested and stored on the capacitor C1, and (2) is available for the rotor 84 at the start of the transition to the on state with the next pulse.

In various embodiments, the excitation of the one or more winding A, B and/or C of the stator 82 after a pulse has ended may widely vary.

In one non-exclusive embodiment, the excitation is a reverse sinusoidal three-phase voltage waveform that is the opposite of that used to drive the electric machine 80 during a given on pulse. For instance, if the rotor 84 is rotating clockwise at 4000 RPMs during a given on pulse, it will continue to rotate at this rate and direction immediately after the given on pulse ends. If the stator is intentionally excited after the given on pulse ends with a reverse rotating (counterclockwise) 4000 RPM field, then the net effect is the rotor 84 is effectively rotating at 8000 RPMs, which means more poll-crossings and a higher frequency of the resulting AC voltage induced in the rotor 84. In response, the AC voltage is rectified by rectifier 87, and the resulting DC voltage is stored on the capacitor C1.

In yet another embodiment, one (or more) of the windings A, B and C can be statically energized while the rotor 84 is rotating. As a result, the rotor 84 will generate an AC voltage that coincides with each pole crossing.

In yet another embodiment, the windings A, B and C can be energized using three-phase AC power, but at a lower frequency or speed compared to the rotation of the rotor 84. As a result, the rotor will generate an AC voltage that coincides with each pole crossing.

It is noted that all the possible embodiments for exiting one or more of the windings A, B and C are not exhaustively listed herein. Consequently, those embodiments mentioned herein should not be construed as limiting in any regard. On the contrary, any embodiment of exciting at least one (or more) of the windings may be used. With any such embodiment, however, at least one (or all) non-excited phases are selectively switched to the negative bus voltage on power rail 88

The above-described process of charging the capacitor C1 to the target boost voltage is typically relatively short in duration, typically 2-3 milliseconds, before the capacitor C1 is charge to its target boost level. Thereafter, for the remainder of the time the electric machine 80 is in the off state, the one or more windings of the stator are de-energized until the start of the next pulse.

In various embodiments, the magnitude of the boost voltage harvested and stored on capacitor C1 may widely vary. Regardless of the magnitude, the boost voltage aids in reducing the turn-on time of the rotor 84. For instance, if the DC power supply 85 provides 400 volts, and an additional 400 volts is harvested and stored on the capacitor C1 when the electric machine 80 is in the off state between pulses, then a total of 800 volts is available at the start of the next on pulse.

With the onset of the next pulse, the DC voltage on the rail 86 and the boost voltage on the capacitor C1 are combined on the rail 92 and provided through the rectifier 87 to the rotor 84. Using the voltage values provided in the above non-exclusive example, 800 volts as opposed to only 400 volts is provided to the rotor 84. With the extra 400 volts, voltage, the winding of the rotor 84 is rapidly energized, developing the desired rotor flux much faster than would be the case if only the 400 volts of the supply 85 is used. Consequently, just as more voltage is needed to speed up the turn-on of the rotor 84, the boost voltage is available.

As the windings of the rotor are energized during the startup process, the boost voltage on the capacitor C1 is depleted, Thereafter, the DC voltage provided by the power supply 85 is used to drive the rotor 84 once it has achieved steady-state operation for the remainder of the on pulse. With this arrangement, the boost voltage is applied to the rotor only when it is needed the most, and for a very short time-period. As a result, the startup time of the rotor is reduced significantly (e.g., typically 2-3 milliseconds), compared to up to 10-100 milliseconds required for comparable, but non-boosted, electric machines.

It is noted that the turn-on inductance of a rotor of a given electric machine is typically much higher than its stator due to its larger number of windings relative to the stator. Consequently, the application of the boost voltage is most beneficial when applied to the rotor as opposed to the stator. However, a boost voltage can similarly be applied to the stator as well.

H-Bridge Rectifier

Many electric machines commonly rely on a transistor-diode H-bridge to aid in demagnetizing the rotor 84 and reducing the generation of a back Electromotive Force (EMF). As described below, the Applicant has discovered that such an H-bridge can also, in addition to reducing back EMF, be used (1) as a rectifier for converting the AC voltage generated by the rotor 84 into the DC voltage when charging the storage capacitor C1, and (2) for providing a circuit path for supplying the boost and power supply voltage to the rotor 84 when energized (e.g., during on pulses or during continuous operation).

Figure 5B:
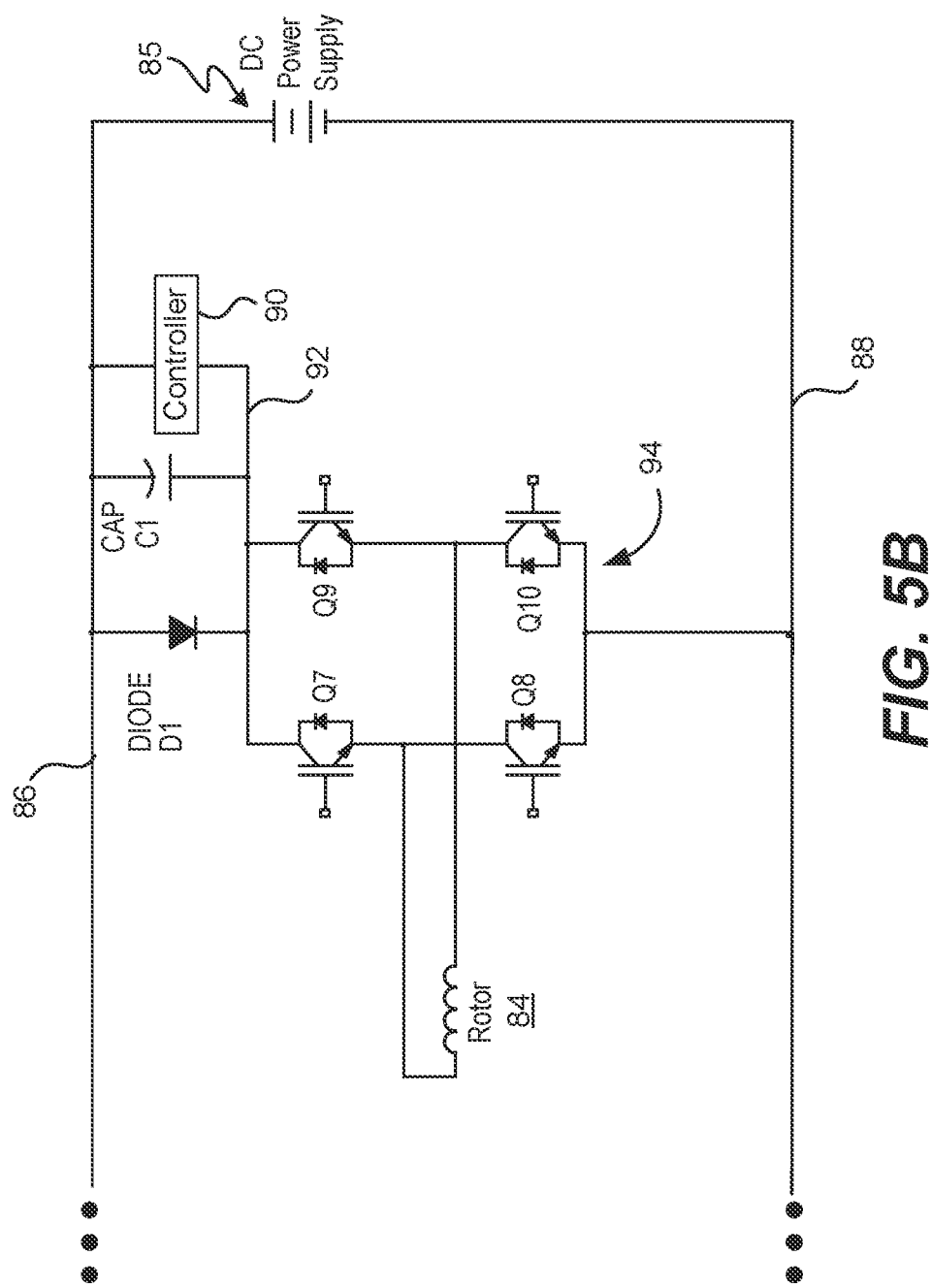
FIG. 5B is an exemplary voltage rectifier used by the boost circuit in accordance with a non-exclusive embodiment of the invention.

Referring to FIG. 5B, an H-bridge rectifier 94 is illustrated. The H-bridge rectifier 94 includes a first transistor-diode pair Q7-Q8 and a second transistor diode pair Q9 and Q10. The remainder of the elements, namely the rotor 84, DC power supply 85, first and second power rails 86, 88, diode D1, storage capacitor C1, controller 90 and rail 92 operate as described above. Also, for the sake of clarity, the remainder of components (e.g., the power converter 22, pulse controller 28, and stator 82) discussed above regarding FIG. 5A are not illustrated.

Immediately following a pulse, the H-bridge rectifier 94 converts the AC voltage generated by the rotor 84 to a DC voltage. When the AC voltage is positive, the diodes associated with transistors Q7 and Q10 are turned on while the diodes associated with transistors Q8 and Q9 are off. When the AC voltage is negative, the diodes associated with transistors Q8 and Q9 are turned on while the diodes associated with transistors Q7 and Q10 are off. The resulting DC voltage is stored on capacitor C1 via the power rail 92. When the capacitor C1 has reached the target boost voltage, the charging process is halted as described above, which ideally occurs within 3-5 milliseconds after the end of an on pulse after the rotor drive circuit is disabled.

Alternatively, the H-bridge rectifier 94 is also used to provide the boost and supply voltages to the rotor 84 on the start of each pulse. By activation transistors-diode pairs Q7 and Q10 or Q9 and Q8, this voltage on the power rail 92 is provided to the rotor 84. The target boost voltage stored by the capacitor C1 is preferably selected to (1) deliver sufficient current such that the current the rotor requires at nominal operation is achieved in the shortest possible time, and (2) upon the nominal steady-state operation of the rotor 84, the boost voltage on C1 is fully depleted, meaning the rotor 84 is energized only by the power supply 84 via rail 86, diode D1, power rail 92 and the H-bridge rectifier 94. Current in the rotor 84 during normal operation (e.g., during continuous operation or once the rotor is fully energized during a pulse) is controlled by Pulse Width Modulation (PWM) drive of the H-bridge IGBTs Q8 or Q10 as is known in the art.

It is noted that while the AC to DC rectification is occurring, the rotor 84 is effectively demagnetized by the H-bridge rectifier 94, reducing or eliminating back EMF.

The boost circuit of the present application as described herein can be used in a wide variety of applications, such as but not limited to electric vehicles (EVs), variable speed and load industrial motor applications, or any other application where greater efficiency of electric machines can be realized using pulsed controlled operation. With EVs for example, as a general rule, the faster the transition times when an electric motor transitions from the off state to the one state at the start of each pulse, the higher the operating efficiency. With this in mind, components such as the capacitor C1 and the diode D1 with the rotor H-Bridge's body diodes or protection diodes acting as a full wave rectifier, boost voltage monitoring circuitry, and the excitation of the phases A, B and/or C of the stator 82, during off periods are ideally selected or otherwise defined to achieve an on-pulse transition time of at least 100 milliseconds, and if possible, 10 milliseconds are even smaller transition times. To achieve these objectives, the size of the capacitor C1 may range from 40 uF or less to 100 uF or more, and the boost voltage stored thereon may range from bus voltage to any voltage not to exceed the safe operating voltages of the H-Bridge components operating limits with sufficient safety margins. It should be understood that the values described herein are merely exemplary and should in no regard be construed as limiting. On the contrary, the size of the capacitor C1, and the boost voltage stored thereon, may widely vary based on any given application or set of circumstances.

Pulse Control Operation

Figure 6:
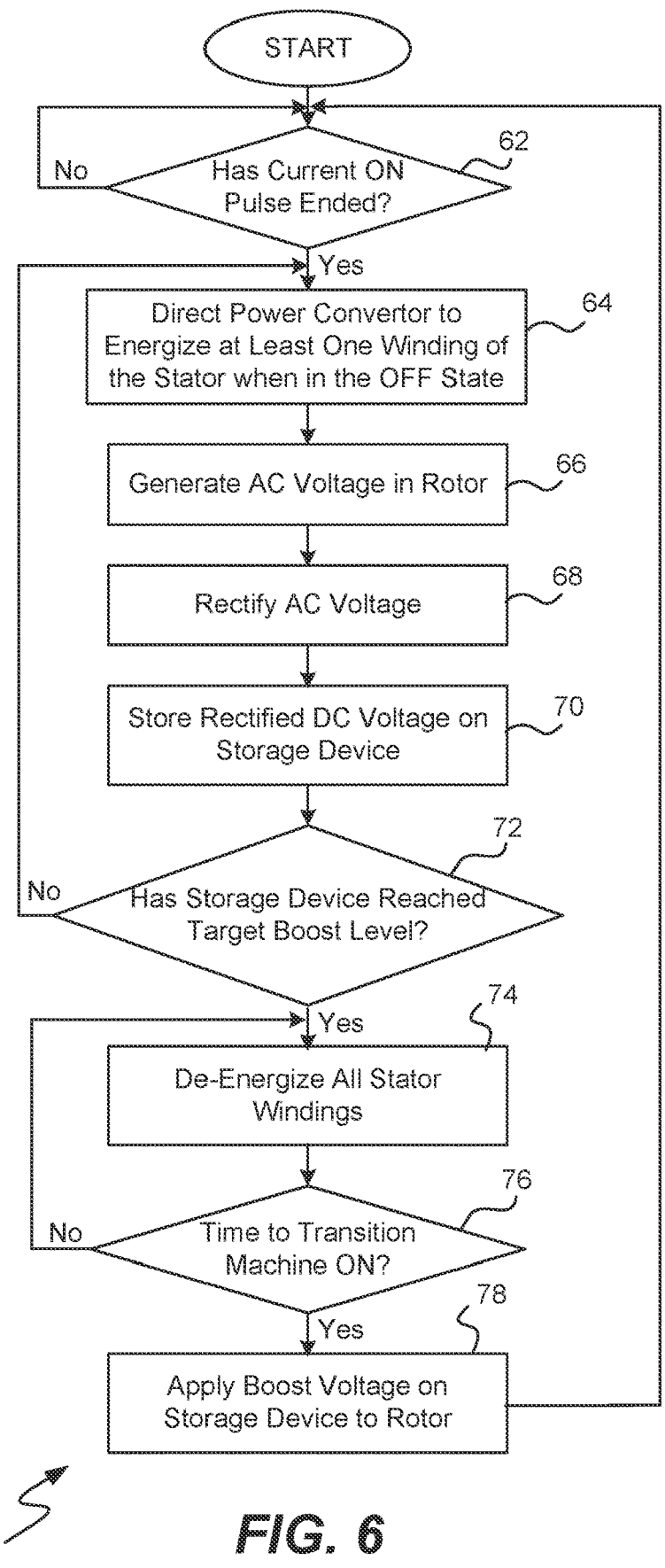
FIG. 6 is a flow diagram illustrating steps for boosting a supply voltage applied to a rotor of the electric machine during pulsed operation in accordance with a non-exclusive embodiment of the invention.

Referring to FIG. 6, a flow diagram 60 illustrating steps for boosting a supply voltage applied to the rotor 84 of the electric machine 80 is illustrated.

In decision step 62, the pulse controller determines if the current on pulse has ended.

If the current pulse has ended, then pulse controller 28 in step 64 transitions the electric machine 80 to the off state, while directing the power controller 22 to energize one or more of the windings of the stator 82 using any of the embodiments mentioned above or any other embodiment not listed herein.

In step 66, the rotor 84 generates an AC voltage in response to the energization of the one or more windings of the stator 82.

In step 68, the rectifier 87 or H-bridge rectifier 94 rectifies the AC voltage into a DC voltage.

In step 70, the DC voltage is used to charge the storage capacitor C1.

In decision step 72, it is determined if the capacitor has reached the target boost voltage. If the target is not reached, the charging continues as steps 66 through 70 are repeated. Typically, the re-charging to the target boost voltage is rapid, taking in the order of 2-3 milliseconds.

In the step 74, the stator windings of the stator 82 are de-energized when the target boost voltage is reached. Thereafter, the stator 82 is dormant for the remainder of the off state until the start of the next on pulse.

In step 76, the pulse controller 28 determines the time when the electric machine is to transition on for the next pulse.

In step 78, the sum of the boost voltage and the voltage from the power supply 85 are provided to the rotor so that it can rapidly turn on. As the winding of the rotor 84 is fully energized as the boost voltage dissipates, only the voltage from the power supply 85 is provided to the rotor 84 for the remainder of the on pulse.

The steps 62 through 78 are preferably continually repeated. In this way, the storage capacitor C1 is continually re-charged to the target boost voltage immediately following the end of each pulse so that the boost voltage is ready and available for the rotor at the start of the next one pulse. Consequently, the time for transitioning between the off state and the on state for each on pulse is significantly reduced, improving the overall operational efficiency of the electric machine.

The Applicants have found that the use of a boost voltage as described herein has reduced the transition time from the off state to the on state to approximately 2-3 milliseconds, which is a significant improvement over any non-boosted electric machine equivalents. As a result, the overall efficiency of such electric machines is improved.

It is noted that other transition times, either longer or shorter, maybe realize using boosting as described herein. The 2-3 millisecond turn-on time, as mentioned herein, is merely illustrative and should in no way be construed as limiting the scope of the present invention in any regard.

Generator Operation

Although the above description has been largely directed to the operation of an electric machine as a motor, in no way should this be construed as limiting. On the contrary, a boost voltage to the windings of a rotor as described herein can also be used during operation of such an electric machine during pulsed control operation as a generator.

Electric Machine Types

It should be apparent from the foregoing description that the described boosted pulsed machine control can be utilized in a wide variety of different applications to improve the energy conversion efficiency of a wide variety of different types of electric motors and generators. These include both AC and DC motors/generators. A few representative types of electric machines that may benefit from the described boosted embodiments of machine pulsing include both asynchronous and synchronous AC electric machines including Induction machines (IM), switched reluctance machines (SRM), Synchronous Reluctance machines (SynRM), Permanent Magnet Synchronous Reluctance machines (PMaSynRM), Hybrid PMaSynRMs; Externally Excited AC Synchronous machines (SyncAC), Permanent Magnet Synchronous machines (PMSM), Eddy current machines, AC linear machines, AC and DC mechanically commutated machines, axial flux motors, etc. Representative DC electric machines include brushless, electrically excited, permanent magnet, series wound, shunt, brushed, compound and others.

Electric Machines and Vehicles

Electric vehicles are now common and are increasing in popularity. It has been predicted that over the course of the next decade or two, electric vehicles will surpass or altogether replace conventional internal combustion engine vehicles.

With electric vehicles, one or more onboard machines is/are provided. When driving the vehicle, the machine acts as a motor to generate torque, which in turn, is used to propel the vehicle. In the case of an electric vehicle, the electric machine(s) is/are used exclusively to generate the needed torque. The torque may be a positive torque to propel the vehicle or a negative torque to transfer vehicle kinetic energy into stored electrical energy. With hybrid vehicles, the onboard electric machines may be used either exclusively, or in cooperation with, an internal combustion engine, to propel the vehicle. With regenerative braking, the machine is typically used to convert mechanical energy into electrical energy that is stored in a storage device, such as a battery or capacitor. The stored energy can be used by the electric machine when operating as a motor, or alternatively to power other electrical bs on the vehicle, such as the air conditioner, heater, defroster, various lighting systems, entertainment system, etc.

The pulsing of an onboard electric machine, with boost voltages as described herein, on a vehicle promises significant advantages for increased efficiency. By increasing efficiency, the range of the vehicle can be increased before either a battery recharge is needed and/or refueling is needed as is the case with hybrids.

Additional Embodiments

Motors used in Heating, Ventilation and Air Conditioning (HVAC) applications are another good example of an application that can benefit from pulsed control. There are several factors that contribute to pulsed motor control being a good fit for HVAC applications. These include the facts that: (a) the motors used in HVAC applications today are predominantly induction motors that don't contain permanent magnets; (b) a high percentage of the motors used in HVAC applications, including in particular variable speed HVAC condensers and/or air handlers, operate a substantial portion of the time operating regions below their high efficiency areas; and (c) the inertia of a fan or pump normally dominates the motor inertia, which tends to further mitigate potential NVH related impacts associated with pulsing.

Although only a few embodiments of the invention have been described in detail, it should be appreciated that the invention may be implemented in many other forms without departing from the spirit or scope of the invention. The various described pulse controllers and other control elements may be implemented, grouped, and configured in a wide variety of different architectures in different embodiments. For example, in some embodiments, the pulse controller may be incorporated into a motor controller or an inverter controller or it may be provided as a separate component. Similarly, for a generator, the pulse controller may be incorporated into a generator controller or a rectifier controller and in combined motor/generators the pulse controller may be incorporated into a combined motor/generator controller or a combined inverter/rectifier controller. In some embodiments, the described control functionality may be implemented algorithmically in software or firmware executed on a processor—which may take any suitable form, including, for example, general purpose processors and microprocessors, DSPs, etc.

Generally, the schemes for pulsed motor control may be implemented digitally, algorithmically, using analog components, or using hybrid approaches. The pulse generator and/or the motor controller may be implemented as code executing on a processor, on programmable logic such as an FPGA (field programmable gate array), in circuitry such as an ASIC (application specific integrated circuit), on a digital signal processor (DSP), using analog components, or any other suitable piece of hardware. In certain me implementations, the described control schemes may be incorporated into object code to be executed on a digital signal processor (DSP) incorporated into an inverter controller (and/or rectifier controller in the context of a generator and/or a combined inverter/rectifier controller).

Therefore, the present embodiments should be considered illustrative and not restrictive, and the invention is not to be limited to the details given herein but may be modified within the scope and equivalents of the appended claims.

What is claimed is:

1. An electric machine comprising:
   a stator;
   a rotor;
   a power converter configured to energize one or more windings of the stator;
   a pulse controller configured to pulse the electric machine between an off state and an on state by controlling the power converter to selectively energize the one or more windings of the stator; and
   a boost circuit configured to store a boost voltage on a storage device when the electric machine is in the off state between on pulses and to provide the boost voltage stored on the storage device to the rotor during a transition of the electric machine from the off state to the on state,
   the boost voltage causing the rotor to turn-on faster, thereby reducing a transition time of the electric machine during the transition from the off state to the on state, relative to if the boost voltage is not provided to the rotor during the transition.

2. The electric machine of claim 1, wherein the rotor is further configured to generate an AC voltage following transitions of the electric machine from the on state to the off state.

3. The electric machine of claim 2, further comprising a rectifier configured to rectify the AC voltage generated by the rotor and to store a DC voltage on the storage device of the boost circuit.

4. The electric machine of claim 3, wherein the rectifier is an H-bridge rectifier including four transistor-diode pairs arranged in an H-bridge configuration.

5. The electric machine of claim 1, wherein the storage device of the boost circuit is a capacitor.

6. The electric machine of claim 1, wherein the boost circuit further comprises a controller configured to clamp the storage of the boost voltage on the storage device once the storage device has achieved a target boost voltage and to prevent the boost voltage from exceeding the target boost voltage.

7. The electric machine of claim 1, wherein the boost circuit further comprises a controller configured to direct the power converter to energizing the one or more windings of the stator following an on pulse for a sufficient period of time to allow the storage device to be charged to a target boost voltage.

8. The electric machine of claim 7, wherein the one or more of the windings of the stator are energized until the storage device is charged to the target boost voltage using one of the following:
(a) a reverse multi-phase sinusoidal voltage waveform that is the opposite of what was used to drive the electric machine during a given on pulse;
(b) statically; or
(c) energized using a different frequency or speed compared to the rotation of the rotor.

9. The electric machine of claim 1, wherein the boost circuit further comprises a controller configured to:
cause the rotor to generate an AC voltage between the on pulses by directing the power converter to energize the one or more windings of the stator when the electric machine is in the off state; and
stop the rotor from generating the AC voltage once the storage device is charged to a target boost voltage by directing the power converter to stop energizing the one or more windings of the stator until the electric machine begins a transition to a next on pulse.

10. The electric machine of claim 1, wherein the stator, the rotor and the power converter are electrically coupled between a first power rail and a second power rail, and a supply voltage is provided on the first power rail by a DC power source.

11. The electric machine of claim 1, wherein the stator has three windings, and the power converter provides:
three phase power to the three windings of the stator during the on pulses when the electric machine is in the on state; and
selective power to the one or more of the windings of the rotor between the on pulses when the electric machine is in the off state.

12. The electric machine of claim 1, wherein the boost circuit includes a rectifier coupled between the rotor and the storage device.

13. The electric machine of claim 1, wherein the boost circuit comprises a controller configured to control the re-charging of the storage device in the off state between the on pulses of the electric machine and to stop the re-charging of the storage device when a target boost voltage has been reached.

14. The electric machine of claim 1, wherein the boost circuit maintains the boost voltage stored on the storage device electrically isolated from a power rail that provides supply voltage to the power inverter.

15. The electric machine of claim 1, wherein the boost voltage applied to the rotor during transitions of the electric machine from the off state to the one state aids in overcoming a turn-on inductance of the rotor so that the rotor can turn on faster relative to if the boost voltage is not applied to the rotor.

16. The electric machine of claim 1, wherein the electric machine is one of the following:
an Alternating Current electric machine;
a Direct Current electric machine;
a synchronous electric machine;
an asynchronous electric machine;
an induction electric machine;
a switched reluctance electric machine;
a synchronous re reluctance electric machine;
permanent magnet synchronous reluctance electric machine;
hybrid magnet synchronous reluctance electric machine;
externally excited synchronous electric machine;
Permanent Magnet Synchronous electric machine;
an eddy current electric machine;
AC linear electric machine;
an AC mechanically commutated electric machine;
a DC mechanically commutated electric machine;
an axial flux electric machine; or
any of brushless, electrically excited, permanent magnet, series wound, shunt, brushed, or compound type DC electric machines.

17. A method for controlling pulsed operation of an electric machine, the method comprising:
applying a first voltage to a rotor of the electric machine when transitioning the electric machine from an off state to an on state when pulsing the electric machine on; and
applying an additional boost voltage to the rotor of the electric machine when transitioning the electric machine from the off state to the on state when pulsing the electric machine on,
the additional boost voltage aiding in overcoming a turn-on inductance of the rotor so that the rotor can turn on faster relative to if the boost voltage is not applied to the rotor.

18. The method of claim 17, wherein the boost voltage is generated by:
inducing the rotor to generate an AC voltage between on pulses of the electric machine when in the off state;
rectifying the AC voltage to a DC voltage; and
storing the DC voltage on a storage device between the on pulses when the electric machine is in the off state,
wherein the stored DC voltage on the storage device is used as the boost voltage during the transitions of the electric machine from the off state to the on state.

19. The method of claim 18, further comprising stopping the storage of the DC voltage on the storage device when the storage device has reached a target boost voltage.

20. The method of claim 19, wherein the stopping of the storage of the DC voltage on the storage device because the storage device has reached the target boost voltage occurs in three (3) milliseconds or less.

21. The method of claim 17, further comprising:
(a) energizing at least one winding of a stator when the electric machine is in the off state between on pulses;
(b) generating an AC voltage in the rotor in response to the energization of the at least one winding of the stator when the electric machine is in the off state between on pulses;
(c) rectifying the AC voltage into a DC voltage; and
(d) storing the DC voltage on a storage device, the DC voltage on the storage device used as the boost voltage applied to the rotor when transitioning the electric machine from the off state to the on state when pulsing the electric machine on.

22. The method of claim 21, further comprising terminating (a) through (d) when the storage device has been charged to a target boost voltage.

23. The method of claim 21, wherein the energizing of at least one winding of a stator when the electric machine is in the off state between on pulses includes one of the following:
(a) a reverse sinusoidal voltage waveform that is the opposite of what was used to drive the electric machine during a given on pulse;
(b) statically; or
(c) energized using a different frequency or speed compared to the rotation of the rotor.

24. The method of claim 17, wherein the turn-on of the rotor with the boost voltage occurs in three (3) milliseconds or less.

25. The method of claim 17, wherein the electric machine is one of the following:
an Alternating Current electric machine;
a Direct Current electric machine;
a synchronous electric machine;
an asynchronous electric machine;
an induction electric machine;
a switched reluctance electric machine;
a synchronous re reluctance electric machine;
permanent magnet synchronous reluctance electric machine;
hybrid magnet synchronous reluctance electric machine;
externally excited synchronous electric machine;
Permanent Magnet Synchronous electric machine;
an eddy current electric machine;
AC linear electric machine;
an AC mechanically commutated electric machine;
a DC mechanically commutated electric machine;
an axial flux electric machine; or
any of brushless, electrically excited, permanent magnet, series wound, shunt, brushed, or compound type DC electric machines.

* * * * *